(12) United States Patent
Caretta (10) Patent No.: US 6,841,113 B2
(45) Date of Patent: Jan. 11, 2005

(54) METHOD AND APPARATUS FOR CURING TIRES

(75) Inventor: Renato Caretta, Gallarate (IT)

(73) Assignee: Pirelli Pneumatici S.p.A., Milan (IT)

( * ) Notice: Subject to any disclaimer, the term of this patent is extended or adjusted under 35 U.S.C. 154(b) by 264 days.

(21) Appl. No.: 10/149,208

(22) PCT Filed: Nov. 29, 2000

(86) PCT No.: PCT/EP00/11943

§ 371 (c)(1),
(2), (4) Date: Jun. 11, 2002

(87) PCT Pub. No.: WO01/43955

PCT Pub. Date: Jun. 21, 2001

(65) Prior Publication Data

US 2002/0185780 A1 Dec. 12, 2002

Related U.S. Application Data

(60) Provisional application No. 60/179,393, filed on Feb. 1, 2000.

(30) Foreign Application Priority Data

Dec. 13, 1999 (EP) .......................................... 99830771

(51) Int. Cl.⁷ .............................................. B29C 35/00
(52) U.S. Cl. ...................... 264/326; 264/327; 425/40; 425/42; 425/47
(58) Field of Search ................................ 264/319, 320, 264/325, 326, 327; 425/35, 40, 42, 47

(56) References Cited

U.S. PATENT DOCUMENTS

| 1,544,002 A | 6/1925 | Grove .......................... 425/40 |
| 5,676,980 A | 10/1997 | Gulka et al. ................... 425/40 |
| 6,238,193 B1 * | 5/2001 | Bosseaux ...................... 425/36 |
| 6,632,393 B2 * | 10/2003 | Fike ........................... 264/501 |

FOREIGN PATENT DOCUMENTS

| EP | 0 123 733 | 11/1984 |
| EP | 0 170 109 | 2/1986 |
| EP | 0 451 832 | 10/1991 |
| EP | 0 459 375 | 12/1991 |
| EP | 0 578 105 A2 | 1/1994 |
| EP | 0 727 296 | 8/1996 |
| EP | 0 919 406 | 6/1999 |
| GB | 1118005 | 6/1968 |
| GB | 1 356 062 | 6/1974 |

* cited by examiner

Primary Examiner—James Sells
(74) Attorney, Agent, or Firm—Finnegan, Henderson, Farabow, Garrett & Dunner, L.L.P.

(57) ABSTRACT

A method for curing a tyre includes the steps of closing the tyre in a mould, heating at least one lower hot table, at least one upper hot table, and at least one annular hot table to transmit heat to the tyre. The at least one lower hot table, the at least one upper hot table, and the at least one annular hot table are associated with the mould. The at least one annular hot table is thermally-connected to a circumferential development of the mould. A quantity of heat provided to the at least one lower hot table is different from a quantity of heat provided to the at least one upper hot table. An associated apparatus includes a mould; at least one lower, upper, and annular tables; and devices for supplying one or more heating fluids to the at least one lower, upper, and annular tables.

47 Claims, 4 Drawing Sheets

FIG.1

METHOD AND APPARATUS FOR CURING TIRES

CROSS-REFERENCE TO RELATED APPLICATIONS

This application is a national stage entry under 35 U.S.C. §371 from International Application No. PCT/EP00/11943, filed Nov. 29, 2000, in the European Patent Office, the contents of which are relied upon and incorporated herein by reference; additionally, Applicant claims the right of priority under 35 U.S.C. §119(a)–(d) based on patent application No. 99830771.4, filed Dec. 13, 1999, in the European Patent Office; further, Applicant claims the benefit under 35 U.S.C. §119(e) based on prior-filed, copending provisional application No. 60/179,393, filed Feb. 1, 2000, in the U.S. Patent and Trademark Office.

BACKGROUND OF THE INVENTION

1. Field of the Invention

The present invention relates to a method for curing tyres, comprising the phases of closing a tyre to be cured in the moulding and curing cavity of an appropriate mould and of heating the lower, upper and lateral walls of said mould to transmit heat to the tyre.

The invention further relates to a device for curing tyres, comprising: a curing mould defining a moulding and curing cavity suitable to receive a tire being processed at least a lower hot table situated adjacently to a lower wall of said curing mould; at least an upper hot table situated adjacently to an upper wall of said curing mould, at least a peripheral hot table situated around the lateral development of the moulding and curing cavity; devices for supplying heating fluid in said hot tables.

2. Description of the Related Art

Production processes for vehicle tyres provide for each tyre, after having been assembled in all its components, to be subjected to a moulding and curing process during which the tyre itself is made to adhere with adequate pressure against the inner walls of a moulding cavity, and to the administration of heat to determine, with the polymerisation of the elastomeric material whereof it is composed, its definitive geometric and structural stabilisation.

With particular reference to the curing of tyres for vehicles, for this purpose the use of so-called centripetal devices is widespread. Examples of such devices are for instance described in the following patents: U.S. Pat. No. 5,676,980, EP 123,733, EP 170,109 and EP 459,375.

Devices of this kind are generally arranged with the axis of the mould in vertical position and the median, or equatorial plane, of the mould horizontal relative to the ground; the moulding cavity is essentially defined between two annular cheeks, respectively inferior and superior with reference to said plane, coaxially arranged to form the exterior surfaces of the sidewalls of the tyre. To the cheeks is combined a crown of sectors arranged circumferentially around the geometric axis of the mould, coinciding with the axis of rotation of the tyre, to shape the tread band of the tyre, define therein a series of indentations and/or grooves arranged in varied ways according to a desired tread design.

The lower cheek is generally fixed relative to a base, whereas the upper cheek, engaged to a so-called lid movable vertically, can be translated axially relative to the lower cheek.

The circumferential sectors, in turn, are slidingly engaged to a sector-holder ring which is integral, depending on the case, either with the lid or with the base. More in particular, the sectors are movable along respective generatrices of a cone frustum shaped surface provided in the sector-holder ring. Simultaneously with the mutual axial actuation between ring and sectors, the latter are simultaneously translated radially to the axis of the mould, between an open condition wherein they are circumferentially distanced from each other, i.e. radially removed from the outer circumferential surface of the tyre contained in the mould, and a closed condition wherein they are radially approached and mutually matching in correspondence with the respective circumferentially opposite edges.

Hearing devices are further provided for transmitting a pre-determined quantity of heat to the tyre closed in the moulding cavity, in order to determine its adequate curing.

These heating devices essentially comprise a plurality of so-called "hot tables" positioned around the components that define the moulding and curing cavity. For the purposes of the present description, the term "hot table" is taken to mean a structural part of the curing unit, presenting at least a cavity, different from the moulding and curing cavity, able to be supplied with any suitable heating fluid.

More specifically, a lower hot table, located immediately underneath the aforesaid lower cheek, an upper hot table, located adjacently above the upper cheek, and an annular hot table associated with the sector-holder ring and extending around the sectors themselves, are provided.

Whilst the upper and lower hot tables are supplied with fluid, usually steam, at the same temperature, in the order of 175° C. by way of indication, the fluid injected into the annular hot table can have a temperature in the order of 185° C., or in any case exceeding the temperature of the fluid injected into the lower and upper chambers.

This greater temperature is selected in consideration of the fact that the crown of the tyre, in contact with the sectors, has a greater thickness than the thickness of the sidewalls and includes the belt structure, i.e. a pack of at least three strips of rubber-coated fabric, textile or metallic, and thus requires a greater quantity of heat to reach, in the same cycle time, substantially the same degree of curing.

In particular, it is also known document GB 1,118,005 disclosing an apparatus for embossing a pattern in the tread band of a pneumatic tyre of the type described above which may supply steam at different temperatures to the chambers of the hot tables in dependence of the thickness of the parts of the tire to be cured.

It has always been deemed that the known curing method described above allowed to fabricate tyres with a homogeneous degree of curing or, at least, with any inconsistencies symmetrically distributed relative to the equatorial plane in relation to the different thickness between the different areas of the tyre and to the different size of the carcass in said areas.

After the premise above, it should be noted that the tyre industry constantly strives to search for continuous improvements both of the performance offered by the tyre in operation and of the degree of uniformity of the product in order continually to restrict the band of tolerability of the values of the viscosity and elasticity characteristics of the cured tyre which deviate from the pre-determined ideal value.

In this search for continuous improvements, sustained by an accurate analysis of the product, the Applicant has found that the tyre often behaves differently, to a greater or lesser extent, when engaged in a curve in a given direction from the way it does when engaged in the opposite direction.

This inconsistent behaviour was initially and hastily attributed to tolerable quantitative differences between the geometric characteristics (thickness, height and profile) of the two semi-finished products that constituted the opposite sidewalls of the tyre or to small variations in the geometric characteristics of the compound of the two sidewalls which took place during the sidewall preparation (straining or calendering) process.

SUMMARY OF THE INVENTION

However, as manufacturing processes and process control systems improved, this notion no longer seemed convincing: the Applicant thus intuited that perhaps the two sidewalls of the tyre, while having the same chemical composition, and specifically the same quantity of the different ingredients in the formula of the compound, as well as the same geometric dimensions, could yet present some diversity in the physical and or viscous-elastic properties of the compound, not perceivable at first glance, caused by or in any phase of the tire manufacturing process.

The Applicant found that tyres with the aforesaid inconsistent behaviour in curves presented sidewalls mainly with a different value of the elasticity module and intuited that such difference in value was to be linked to a different degree of curing of the sidewall compound. The Applicant then understood that the known curing method, with the intent of obtaining a tyre with homogeneous characteristics, in particular with regard to the sidewalls, had transferred the concept of homogeneity also to the temperatures whereas the steam was supplied to the hot tables of the curing mould.

In practice, instead, also for the specific lay of the curing mould with the cheeks radially superposed and parallel relative to the ground, the imposition of a homogeneous supply temperature for the two tables, lower and upper, did not translate into a homogeneous quantity of heat absorbed by the sidewalls of the tyre Indeed, the equality of the temperatures of the steam introduced into the lower and upper hot tables, led in fact to a non-homogeneous thermal condition of such tables since the lower hot table, transmitting and irradiating heat upwards, contributed to heating the upper hot table with the consequent greater heat absorption thereby.

This different heat absorption by the two hot tables, and by the corresponding cheeks of the mould, entailed a different quantity of heat transferred to the sidewalls of the tyre and hence a different degree of reticulation between the two sidewalls, with the consequent diversity in mechanical and behavioural characteristics observed in the finished tire In accordance with the invention, the problem has been solved with a different heating of the two hot tables, lower and upper, dimensioned taking into account the transmission of heat between the different parts of the curing device, in order to determine an equal absorption of heat by the two sidewalls subjected to curing It was further noted that this way of proceeding allows also to improve the curing homogeneity of the circumferential portions of tread on the shoulders of the tyre.

In a first aspect, the invention thus relates to a method for curing a tyre entailing the use of curing mould presenting a moulding and curing cavity suitable for receiving a tyre being processed, a lower hot table and an upper hot table axially opposed and suitable for operating on respective sidewalls of the tyre and at least an annular hot table positioned around the circumferential development of the moulding and curing cavity, comprising the following phases:

closing a tyre to be cured in said moulding and curing cavity;

heating the lower, upper and annular hot tables to transmit heat to the tyre, wherein different quantities of heat are transferred to said hot tables during said heating phase, in order to cure the tyre homogeneously.

In accordance with a first aspect of the present invention, it was found that it is possible to achieve unexpected improvements in the tyre curing process, particularly in terms of homogeneity in the entyre structure of the cured tyre, if the hot tables, or different portions thereof, are supplied independently with different heat inflows, and in particular if the temperature of the steam or other heating fluid fed into the lower hot table is higher than the temperature of the heating fluid fed into the upper hot table.

In accordance with this aspect of the invention, a method for curing a tyre is characterised in that the tyre heating phase is carried out supplying the lower hot table with heat in a greater quantity than the heat supplied to the upper hot table.

Alternatively or in combination with this aspect, also the heating of the annular hot table is performed by supplying its lower portion with heat in greater quantity than the heat supplied to its upper portion.

Preferably, the heating of the hot tables is effected by supplying a heating fluid to the hot tables themselves, and still more preferably, the fluid supplied to the lower hot table and/or to a lower portion of the annular hot table has a greater temperature than the temperature of the fluid supplied to the upper hot table and/or respectively to an upper portion of the annular hot table itself.

For this purpose, the fluid supplied to the lower hot table can advantageously also be supplied to a lower portion of the annular hot table, whilst the fluid supplied to the upper hot table can advantageously also be supplied to an upper portion of the annular hot table.

According to a preferential embodiment, the fluid supplied to the lower hot table comprises dry saturated steam at a temperature ranging between 155° C. and 165° C., whilst the fluid supplied to the upper hot table comprises dry saturated steam at a temperature ranging between 148° C. and 158° C.

In one of its different aspects, the invention relates to a device for curing tyres for wheels of vehicles, characterised in that the devices for supplying the fluid supply differentiated portions of said hot tables in mutually independent fashion, and in particular, they supply the lower hot table with fluid at a different, preferably higher, temperature, than the temperature of the fluid supplied to the upper hot table.

Preferably, the annular hot table is divided into at least a lower cavity and at least an upper cavity according to a diametrical plane relative to the moulding and curing cavity, so that the fluid supplying devices can supply the lower cavity of the annular hot table with fluid at different, preferably higher, temperature, than that of the fluid supplied to the upper cavity of the annular hot table itself.

For this purpose it can preferably be provided for the lower cavity of the annular hot table to be in fluid communication with the lower hot table, whilst the upper cavity of the annular hot table is in fluid communication with the upper hot table.

According to a preferential embodiment of the invention the fluid supplying devices further comprise at least an injection conduit discharging into the interior of the moulding and curing cavity and at least an extraction conduit originating from the same moulding and curing cavity.

In accordance with a different preferential embodiment of the invention, the lower cavity and the upper cavity of the annular hot table are respectively obtained in an upper containment portion and a lower containment portion of a containment structure; preferably, said containment portions are mutually movable between a closed condition wherein they are in mutual contact, mutually matching preferably on a diametrical plane of the moulding cavity, and an open condition wherein they are mutually axially distanced.

More in particular, in the closed condition the upper containment portion and the lower containment portion can advantageously mutually match according to a median equatorial plane of the moulding and curing cavity.

In accordance with a further aspect of the invention, which can also be exploited independently of the above description, the mould comprises the usual crown of sectors divided into a plurality of lower radial sectors and a plurality of upper radial sectors respectively engaged in said lower and upper containment portions, circumferentially distributed around the geometric axis of said moulding and curing cavity; each of said sectors comprises a support body slidingly engaged in the corresponding containment portion to be selectively moved, simultaneously with the mutual axial motion of the containment portions, between a closed condition, wherein said sectors are mutually approached and matching to define the moulding and curing cavity, and an open condition wherein the sectors of the same plurality are radially removed relative to the aforesaid geometric axis, circumferentially distanced from each other, and axially distanced relative to the sectors of the opposite plurality, and each of said sectors further comprises at least a moulding die removably engaged to the support body.

Preferably, in the closed condition the lower sectors and the upper sectors mutually match according to the equatorial median plane of the moulding and curing cavity.

It is also preferable for each of said sectors to be operatively engaged in the annular containment portion, slidingly guided along a corresponding cone frustum shaped surface obtained on the inner surface of its containment portion, respectively lower and upper, to determine the mutual radial removal of said sectors.

Preferably, to each support body are engaged at least two of said moulding dies able to slide on the support body itself and mutually movable according to a circumferential direction relative to the moulding and curing cavity.

Each of said moulding dies advantageously presents a circumferential extension corresponding to at least a pitch of a tread design to be defined on the tyre being manufactured.

In accordance with this inventive aspect of the subject device, the curing cycle of the tyre, once the curing phase has been completed, comprises the additional phase of removing the dies from the aforesaid geometric axis, to open the curing mould, guiding said dies by means of indentations produced by the dies themselves in the tread band.

Further features and advantages shall become more readily apparent from the detailed description of a preferred but not exclusive embodiment of a method and a device for curing tyres for vehicle wheels according to the present invention.

BRIEF DESCRIPTION OF THE DRAWINGS

The description shall be given below with reference to the accompanying drawings, provided purely by way of non-limiting indication, in which.

DETAILED DESCRIPTION OF THE PREFERRED EMBODIMENTS

With reference to the aforementioned drawings, the reference number 1 indicates in its entirety a device for curing tyres for vehicle wheels, according to the present invention.

The device 1 comprises a curing mould 2 operatively housed in a containment structure 3 and defining in its interior a moulding and curing cavity 4 suitable to receive a tyre 5 undergoing work.

More in particular, the mould 2 essentially presents a lower cheek 6 and an upper cheek 7 mutually coaxial and able to operate on respective sidewalls 5a of the tyre 5, as well as a crown of radial sectors 8 circumferentially distributed around a geometric axis Y—Y of the moulding cavity 4, coinciding with the axis of rotation of the tyre 5, and able to operate on a tread band 5b of the tyre itself.

Within the moulding cavity, a curing bag of the usual kind (not shown) can operate, but in the preferential embodiment of the invention it is preferred to omit such a bag which constitutes a disadvantageous obstacle to the transmission of heat towards the radially interior surface of the tyre.

For the purpose of locking the position of the tyre undergoing work within the moulding cavity, an upper gripping organ 30 and a lower gripping organ 31 are preferably associated to the lower cheek 6 and upper cheek 7, the gripping organs 30 and 31 can be activated independently of each other in any convenient way, to be brought from a resting position wherein their diametrical size is lesser than the inner diameter of the bead of the tyre 5, to an operative condition wherein they present a greater diametrical size than said diameter so that they are able to hold respective beads 5c of the tyre 5 in correspondence with the inner circumferential edges of the respective lower cheek 6 and upper cheek 7.

Alternatively, the tyre undergoing work can be mounted on a rigid support (not shown) having the shape of the inner surface of the tyre, whereon the tire has preferably been constructed from the start by assembling the different components, for instance according to patent application EP 0 919 406 by the same Applicant.

The lower cheek 6 and upper cheek 7 are respectively fastened above a base portion 9 of the containment structure 3, and below a closure portion 10 of the containment portion itself. The sectors 8 are in turn engaged inside an annular portion 11 of the containment structure 3.

In a preferential embodiment of the invention, the curing mould 2 is subdivided into an upper portion 2a and a lower portion 2b able to be mutually approached to match substantially according to an equatorial median plane X—X of the moulding and curing cavity 4 and, hence, of the tyre 5 undergoing work.

For this purpose, each circumferential sector 8 presents an upper portion 8a and a lower portion 8b able to be coupled in a condition of mutual contact on a median plane, preferably on the equatorial plane X—X.

The annular portion 11 of the containment structure 3 is in turn subdivided in an upper semi-part 11a and a lower semi-part 11b, presenting respective upper 12a, and lower 12b, cone frustum shaped inner surfaces, symmetrically opposite and diverging towards the equatorial plane X—X. The upper semi-part 11a of the annular portion 11 forms, together with the closure portion 10, an upper containment portion 3a of the containment structure 3, whereas the lower semi-part 11b of the annular portion 11 defines, together with the base portion 9, a lower containment structure 3b of the containment structure itself.

Figure 1:
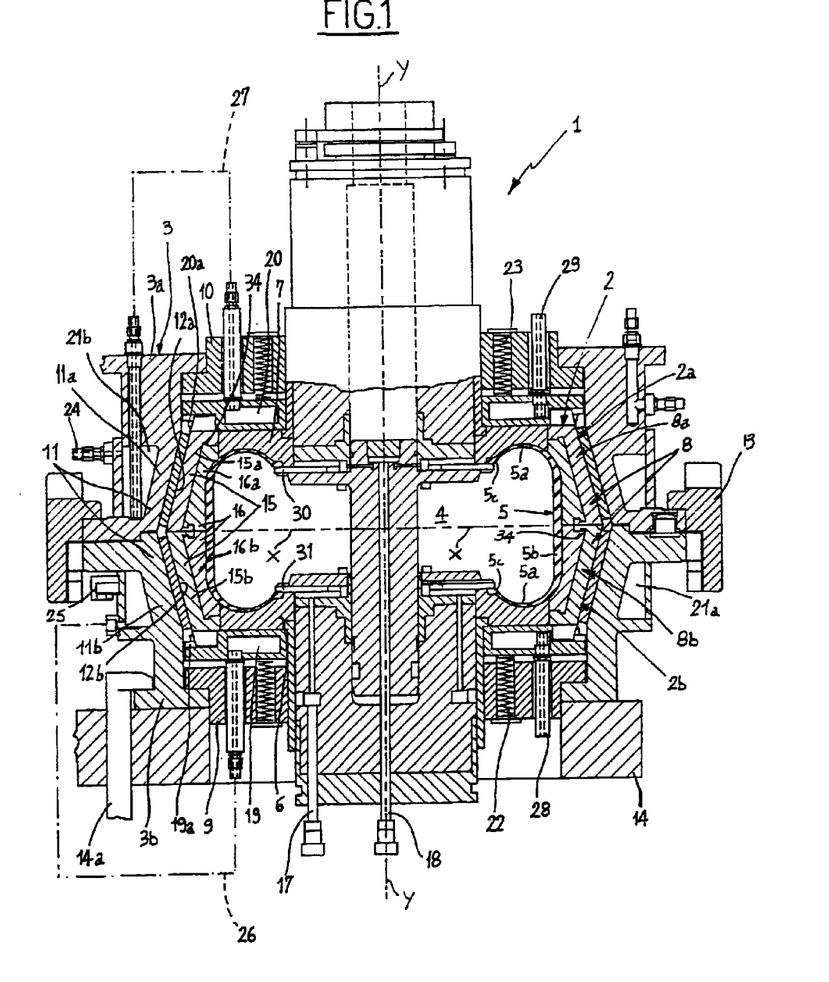
FIG. 1 is a diametrical section of a device according to the invention, with a tyre undergoing work closed in the moulding cavity.
Figure 4:
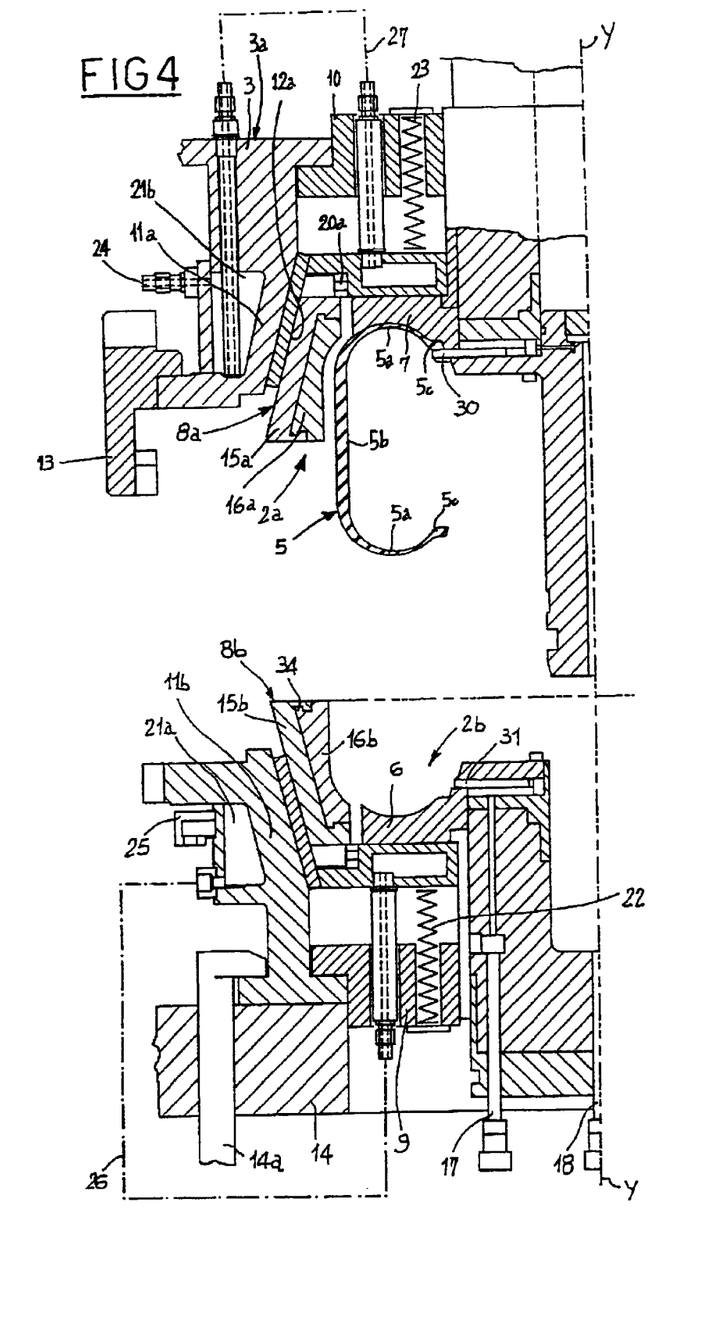
FIG. 4 shows a semi-section of the device in an operative phase in which the tyre is extracted from the lower portion of the mould.

The upper 3a and lower 3b containment portions are axially movable relative to each other along the geometric axis Y—Y between a closed condition wherein they match according to a diametrical plane, for instance as shown in FIG. 1, and an open condition wherein they are mutually removed, for instance as shown in FIG. 4, to allow the operations of loading and removing the tyre 5 from the moulding and curing cavity 4. For this purpose it can for example be provided for the upper containment portion 3a to be operatively engageable by a suitable lifting apparatus not shown herein as it is not relevant for the purposes of the invention and achievable in any manner convenient to the person versed in the art, for instance as described in patent EP 0,459,375.

The illustrated embodiment also provides for the upper and lower containment portions 3a and 3b to be removably fastened relative to each other in the closed condition by means of an annular bayonet closure organ 13 operating on circumferential flanges 13a provided in correspondence with junction edges between the upper and lower containment portions themselves.

The presence of the annular bayonet closure organ 13 allows to maintain the mould 2 in closed conditions during the tyre curing cycle and further allows, if necessary, to remove the entyre device 1 from a support base 14, after disengaging removable coupling means 14a operating on the lower containment portion 3b.

Each of the upper and lower portions 8a and 8b of the sectors 8 is slidingly guided, in any manner convenient for the person versed in the art, according to a generatrix of the respective upper interior cone frustum shaped surface 12a, or lower interior cone frustum shaped surface 12b. The mobility of the upper portions 8a and lower portions 8b of the sectors 8 along the interior cone frustum shaped surfaces 12a, 12b is such that, following the mutual axial actuation of the upper and lower containment portions 3a and 3b, the upper and lower portions of the sectors themselves are subject to translating between a closed position wherein they are mutually approached and matching in the circumferential direction to define the moulding and curing cavity 4, and an open condition wherein they are mutually removed both in the axial direction and radially to the geometric axis Y—Y, to allow the insertion and removal of the tyre 5.

In accordance with the present invention, each of the sectors 8 comprises essentially a support body 15 operatively engaged in the containment structure 3 and bearing a plurality of moulding dies 16, preferably from one to four, each of which extends according to at least a corresponding "pitch" of the tread design to be achieved on the tyre 5, preferably a multiple of said pitch.

For purposes of the present description, the term "pitch" means a circumferential portion of the tread band 5b of the tyre 5, comprising a portion of tread design which repeats circumferentially identical to itself, for instance delimited by the distances between the centres of two consecutive homologous transverse grooves concurring in the definition of the tread design.

Advantageously, each support body 15 is subdivided into an upper portion 15a and a lower portion 15b slidingly engaged respectively to the upper interior cone frustum shaped surface 12a and to the lower interior cone frustum shaped surface 12b of the upper and lower containment portions 3a and 3b. The upper portion 15 and lower portion 15b of each support body 15 are further guided in a direction radial to the geometric axis Y—Y respectively by means of an upper sliding guide 20a and a lower sliding guide 19a positioned peripherally relative to the upper cheek 6 and lower cheek 7.

Each moulding die 16 is in turn subdivided into an upper portion 16a and a lower portion 16b respectively engaged to the upper portion 15a and lower portion 15b of the corresponding support body 15.

In a preferential embodiment, to each support body 15 is associated a pair of moulding dies 16. In this circumstance, when a tyre 5 is manufactured whose tread design presents, for instance, sixty-four pitches, thirty-two support bodies 15 shall be provided, each subdivided into a respective upper portion 15 and lower portion 15b.

For the purposes of the present invention, the number of support bodies 15 can, in any case, be equal or corresponding to a sub-multiple of the number of dies 16 and, hence, of the circumferential pitches comprised in the tread design.

Each die 16, and more specifically each of the upper portions 16a and lower portions 16b composing it, is preferably engaged to the respective upper portion 15a and lower portion 15b of the support body 15 with the possibility of sliding in circumferential direction. For this purpose, in dies 16, terminal projections 34 can be provided, slidingly guided in respective undercuts presented by the base body 15, all for instance as described in patent EP 0 451 832.

Figure 6:
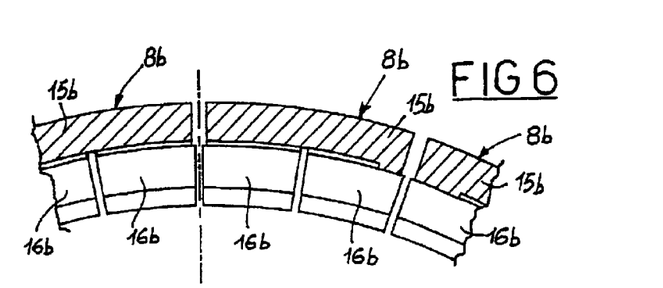
FIG. 6 is an interrupted section taken according to the trace VI—VI of FIG. 2

A FIG. 6 clearly shows, when the curing mould is in open conditions, and in any case when the sectors 8 are radially removed from the geometric axis Y, each of the moulding dies 16 is distanced relative to the circumferentially adjacent die according to a lesser measure than the distance between two circumferentially contiguous support bodies 15. More in particular, it is provided for the distance measurable between two circumferentially contiguous support bodies 15 to be at least equal to the distance measurable on average between two contiguous dies 16, multiplied times the number of dies associated to each support body 15. In this way, one has the certainty that when the sectors 8 are radially approached in the closed condition, each moulding die 16 perfectly matches the circumferentially adjacent dies without any chance that a premature interference between the circumferentially contiguous support bodies 15 may prevent the correct closure of the mould 2.

The presence of a number of dies 16 corresponding to the number of pitches comprising the tread design and movable in a mutually independent manner in the direction of circumferential development, assures that when the mould 2 is closed each matrix 16 penetrates the tread band 5b of the tyre 5 according to a direction perfectly radial to the geometric axis Y—Y. In this way it is certain that no anomalous stresses and/of deformations are imparted to the raw elastomeric material constituting the tread band 5b, as would instead be the case with the use of traditional moulds with eight or sixteen dies, of relatively high circumferential extension. Moulds of this kind cannot confer a perfectly radial actuation trajectory to all parts destined to form the tread band, causing physical and structural inconsistencies in the finished tyre which translate into performance shortfalls by the tyre. In particular, one of the most significant drawbacks is constituted by the characteristic rolling noisiness of the tyre, identified by persons versed in the art with the definition of "eighth harmonic".

It should further be noted that the subdivision of the sectors 8 of the mould 2 into an upper portion 8a and a lower portion 8b allows considerably to limit the radial excursion necessary to the sectors themselves to allow the introduction and removal of the tyre 5. In practice, the radial excursion of the sectors 8, and more in particular of each of their portions 8a, 8b, can advantageously be limited to the amount necessary to achieve the penetration of the ribs, present on the moulding dies 16, into the tread band 5b according to the desired depth.

The vulcanising unit 1 further comprises heating devices able to apply heat to the tyre 5, both from its interior and from its exterior, to determine its correct curing.

For the purposes of administering heat inside the tyre 5, the heating devices can for instance comprise a steam injection conduit 17 and a steam extraction conduit 18 communicating with the interior of the curing bag 4 to inject, and respectively, remove steam therefrom.

For the purposes of administering heat from the exterior of the tyre 5, the heating devices further comprise a lower hot table 19 located adjacently to the lower cheek 6, an upper hot table 20 located adjacently to the upper cheek 7, and at least an annular hot table 21a, 21b positioned around the circumferential development of the moulding and curing cavity 4, concentrically to the geometric axis Y—Y.

The lower hot table 19 and the upper hot table 20 are axially movable in the respective lower and upper containment portions 3b and 3a to determine the radial removal of the lower portions 8b and upper portions 8a of the sectors 8 following the mutual axial removal of the upper and lower containment portions 3a and 3b. For this purpose the lower hot table 19, peripherally bearing the aforesaid lower sliding guides 19a, is constantly maintained against the lower cheek 6 by means of lower thrust springs 22 or equivalent elastic means operating between the lower cheek itself and the base portion 9 of the containment structure 3. Similarly, the upper hot table 20, peripherally bearing the aforesaid upper sliding guides 20a, is constantly maintained against the upper cheek 7 by means of upper thrust springs 23 or equivalent elastic means operating between the hot table itself and the closure portion 10 of the containment structure 3.

The annular hot table 21a, 21b is in turn preferably integrated in the structure of the annular portion 11 of the containment structure 3, and is essentially defined by a lower annular cavity 21a and an upper annular cavity 21b obtained respectively in the upper semi-part 11a and in the lower semi-part 11b of the annular portion itself.

The aforementioned heating devices further comprise steam supplying means routed into the lower hot table 19, upper hot table 20 and circumferential hot table 21a, 21b.

According to the present invention, the steam supplying means, not described in detail herein since they can be embodied in any manner convenient to the person versed in the art, are able to supply into the lower hot table 19, and into the lower cavity 21a of the annular hot table, steam at higher temperature than the steam supplied into the upper hot table 20 and into the upper annular cavity 21b of the annular hot table itself.

More specifically, in a preferential embodiment the steam supplied into the lower hot table 19 presents a temperature ranging between 155° C. and 165° C., whereas the temperature of the steam supplied into the upper hot table 20 ranges between 148° C. and 158° C.

For purposes of supplying steam at differentiated temperatures, it is preferably provided for the upper annular cavity 21b of the circumferential hot table to be in fluid communication with the upper hot table 20, whilst the lower annular cavity 21b of the circumferential hot table is in fluid communication with the lower hot table 19.

Externally to the containment structure 3, and more specifically on each of the upper semi-part 11a and lower semi-part 11b of the annular portion 11, a first and a second fluid-dynamic junction elements 24, 25 are provided, whereto respective steam delivery pipelines (not shown), coming from the aforementioned steam supply means, can be engaged.

The steam injected into the lower annular cavity 21a of the circumferential hot table 21a, 21b is transferred into the lower hot table 19 through a first junction pipeline indicated by the dashed line 26.

Similarly, the steam injected into the upper annular cavity 21b of the circumferential hot table 21b is transferred into the upper hot table 20 through a second junction pipeline indicated by the dashed line 27.

A first and a second output junction 28, 29 allow the evacuation of the steam respectively from the lower hot table 19 and from the upper hot table 20.

It should be noted that the supply of the steam at different temperatures respectively for the upper portion 2a and for the lower portion 2b of the mould 2 determines an unexpected homogeneity in the delivery of heat between the different components of the mould itself and especially to the tyre 5 undergoing work.

The Applicant has become aware that an appreciable portion of the heat dissipated by the lower hot table 19, as well as by the lower annular cavity 21a of the circumferential hot table 21a, 21b is transmitted to the upper portion 2a of the mould 2 through the natural tendency of hot air to rise.

Moreover, the higher temperature of the steam injected into the lower portion 2b of the mould 2 compensates for the heat dissipation from the lower cheek 6 and from the lower portions 8b of the sectors 8, particularly considerable when replacing the tyre 5 undergoing work, when the vulcanising unit 1 remains completely open in the absence of the tyre itself.

After the above description, prevalently structural, the operation of the curing device according to the present invention shall be described below.

Simultaneously with the closure of the tyre 5 undergoing work within the mould 1, steam is supplied into the lower hot table 19, upper hot table 20 and circumferential hot table 21a, 21b as described previously, to determine a homogeneous administration of heat through the outer surfaces of the tyre itself.

At the same time, steam is injected into the interior of the moulding and curing cavity 4, to provide heat also through the inner surfaces of the tyre 5. Throughout the entyre curing cycle, the beads 5c of the tyre 5 are withheld against the internal circumferential edges of the respective cheeks 6, 7: in the embodiment of the vulcanising unit shown in the figures, this holding action is effected by means of the upper and lower gripping means 30 and 31, both readied in operative condition before beginning the injection of steam into the moulding and curing cavity 4.

The injection of steam into the moulding and curing cavity 4 can be followed, after a predetermined time, by the injection of an inert gas such as high-pressure nitrogen, to assure the perfect penetration of the tread band 5b of the tyre 5 by the moulding dies 16.

Once the curing cycle, which can require a time ranging between 10 and 30 minutes, depending on the dimensions and structure of the tyre to be cured, is complete, the inert gas and the vapours still present in the moulding and curing cavity 4 are evacuated therefrom, and the bayonet closure organ 13 is rotated angularly to allow the opening of the mould 2 by the lifting of the upper portion 3a of the containment structure 3.

Figure 2:
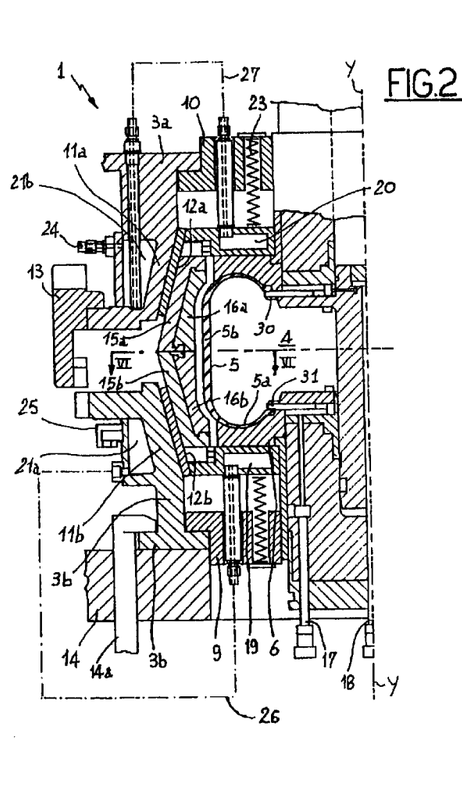
FIG. 2 shows a semi-section of the device of FIG. 1 in an operative phase in which circumferential sectors of the curing mould disengage the tyre undergoing work.

In an initial phase of this lifting operation, as shown in FIG. 2, the upper and lower thrust springs 23 and 22 cause the upper and lower hot tables 20 and 19 to move away from the respective closure portion 10 and base portion 9 of the containment structure 3, causing the sliding of the upper portions 8a and of the lower portions 8b of the sectors 8 on the internal cone frustum shaped inner surfaces 12a, 12b of the annular portion 11.

In this situation, the sectors 8 move radially away from the axis Y—Y, causing the moulding dies 16 to disengage from the tread band 5b of the tyre 5, whilst the upper and lower portions 8a and 9b of the sectors themselves, by effect of the upper springs 23 and of the lower springs 22, are maintained in mutual contact (FIG. 2) and in mutually opposite thrusting relationship.

Simultaneously with the initial removal phase of the upper portion 3a of the containment structure 3, the upper gripping organ 30 is brought to a resting condition to free the upper bead 5c of the tyre 5, whilst the lower gripping organ 31 maintains the lower bead engaged on the lower cheek 6.

Figure 3:
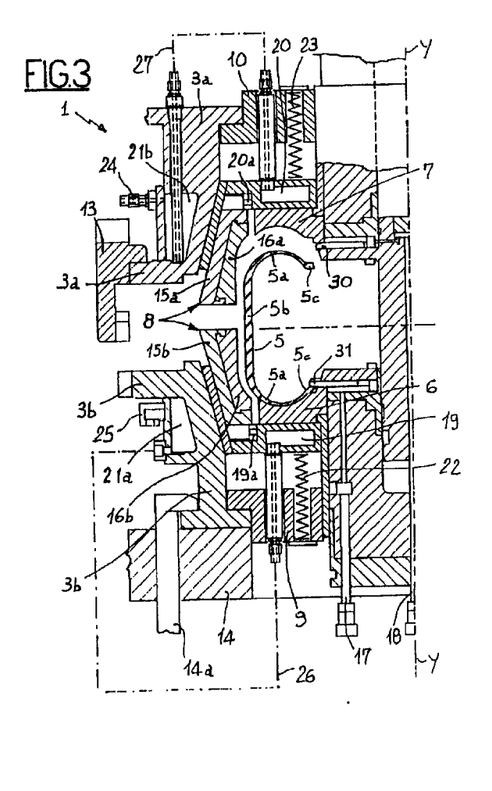
FIG. 3 shows a semi-section of the device in an operative phase in which the detachment of tyre from the upper cheek of the curing mould is carried out.

Therefore, with the further lifting of the upper portion 3a of the containment structure 3, and the consequent move of the upper portion 2a away from the lower portion 2b of the mould 2, the detachment of the tyre 5 from the upper cheek 7 is brought about, as per FIG. 3.

Once this operation has been completed, the upper containment structure 3a is lowered again until the upper portions 8a of the sectors 8 are again brought in contact on the respective lower portions 8b, whereupon the upper gripping organ 30 is again brought in operative condition to hold the upper bead 5c of the tyre 5 against the upper cheek 7.

The lower gripping organ 31 is in turn brought to the resting condition by freeing the lower bead 5c of the tyre 5 in such a way that the tyre itself is able to be detached from the lower cheek 6 and extracted from the lower portion 3b of the containment structure 3 as a result of the new lifting of the upper portion 3a, as shown in FIG. 4.

Figure 5:
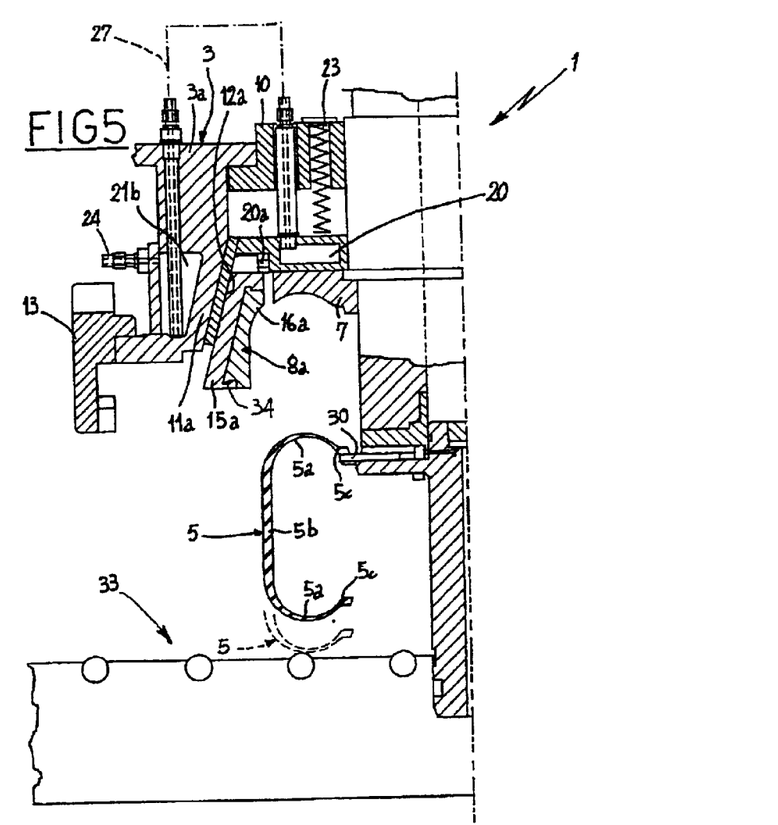
FIG. 5 shows a phase whereby the tyre is laid onto a support plane with rollers.

The upper portion 3a of the containment structure 3 is therefore able to be translated laterally relative to the lower portion 3b in such a way that the tyre 5, previously detached from the upper cheek 7, can be laid on a roller bed 33 or other suitable collection means, following the translation of the upper gripping organ 30 in the resting condition after the lowering of the upper portion 3a or of the upper gripping organ alone, as shown in FIG. 5

Once the cured tyre is released on the roller bed 33, the device 1 is ready to receive in engagement a new tyre to be cured which, through any means suitable for the purpose, will be positioned coaxially with its own upper bead 5c above the upper gripping organ 30. The latter shall subsequently be brought to the operative condition to engage the bead 5c of the new tyre 5 against the inner circumferential border of the upper cheek 7.

The upper portion 3a of the containment structure 3, after having been coaxially brought back above the lower containment portion 3b, shall be lowered thereon, to determine the closure of the new tyre 5 in the mould 2.

The present invention achieves important advantages.

The provision of steam at differentiated temperatures respectively for heating the upper and lower part of the mould allows an optimal distribution of the heat administered to the tyre which advantageously brings about a high degree of uniformity of the cured tyre and of its operating performance.

The method according to the invention originates from the intuition that the lower hot table must be supplied with steam at a determined temperature corresponding with that necessary for a correct curing of the lower sidewall and that the upper hot table must be supplied with steam at a lower temperature according to a predetermined quantity to that the difference between the two temperatures is substantially compensated for by the inflow of heat transferred and emitted upwards by the lower part of the vulcanising unit.

Advantageously the difference between the temperatures at which the steam is supplied to the cheeks of the mould translates into a uniformity of characteristics and performance for the two sidewalls of the tyre.

Moreover, very favourably, the higher temperature of the steam injected into the lower portion 2b of the mould 2 compensates for the dissipation of heat from the lower cheek 6 and from the lower portions 8b of the sectors 8, particularly considerable when replacing the tyre 5 undergoing work, when the device 1 remains completely open in the absence of the tyre itself.

By way of non limiting indication, it is specified that the Applicant has found particularly advantageous the modification of the temperature of the fluids of the curing cycle, normally carried out, as indicated below, in accordance with the invention and with reference to a curing press equipped with curing bag, for curing tyres ranging in size from 185/65R15 and 254/40R18.

TABLE 1

| Devices | Temperatures for Prior Art Method (° C.) | Temperatures for Invention Method (° C.) |
| --- | --- | --- |
| Curing Bag | 200 | 200 |
| Upper Annular Hot Table | 180 | 156 |
| Lower Annular Hot Table | 180 | 159 |
| Lower Cheek Hot Table | 160 | 159 |
| Upper Cheek Hot Table | 160 | 156 |
| Cycle Duration (min.) | 14'–25' | 10'–19' |
| Energy Consumption (kcal/kg) | 2100 | 1500 |

The results of bench and road tests confirm, through the high degree of homogeneity and uniformity of the structural and behavioural characteristics of the tyres, the excellent distribution of the heat administered to the tyre achieved with the provision of steam at differentiated temperatures respectively for heating the upper and the lower part of the mould 2.

In particular, the homogeneity of the distribution of heat on the opposite sidewalls of the tyre is greatly improved, overcoming the limitations of the state of the art where, in spite of the contrivances adopted to try to obtain a temperature of the curing fluid that is exactly identical between the lower hot table and the upper hot table, it was always difficult to obtain the same degree of curing on the two sidewalls of the tire: the one situated superiorly always had a tendency to be over-cured relative to the sidewall situated inferiorly.

It should further be noted that, advantageously, the lower temperature of the steam supplied into the two tables translates into less energy consumption per tyre and per vulcanising unit, quite appreciable in relation to the number of curing devices simultaneously in use.

The optimisation of the distribution of the head transferred through the mould allows to achieve considerable improvements in terms of caloric expenditure, thanks to the additional constructive peculiarities of the subject device.

It should be noted, in fact, that the construction of the mould 2 and of the containment structure 3 in two semi-parts subdivided on the equatorial plane allows to minimise, as stated, the radial excursion that the sectors 8 must perform during the opening phase to allow the removal and reintroduction of the tires undergoing work.

In this situation the sectors remain very close to each other even when the device is fully open, thereby avoiding excessive heat losses, which do instead take place in the moulds constructed according to the prior art, wherein the sectors are obtained in a single piece and connected to a sole sector-bearing ring so that they are considerably distanced from each other when the vulcanising unit is open.

The constructive features adopted in the realisation of the sectors further confer a reduced thermal inertia to the sectors themselves, which reduced thermal inertia is also allowed by the containment of heat dissipation during the opening phase. Exploiting this reduced thermal inertia in an original and advantageous manner, the invention proposes to supply the portions of the annular hot table with steam at the same temperature (with the same steam) as the steam injected into the upper and lower hot tables, thereby eliminating the need to provide an additional supply of steam at different temperatures for the annular hot table.

What is claimed is:

1. A method for curing a tyre, comprising the steps of:
   closing the tyre in a mould;
   heating a lower hot table to transmit heat to the tyre;
   heating an upper hot table to transmit heat to the tyre; and
   heating an annular hot table to transmit heat to the tyre;
   wherein the lower hot table, the upper hot table, and the annular hot table are associated with the mould,
   wherein the annular hot table is thermally-connected to a circumferential development of the mould, and
   wherein a quantity of heat provided to the lower hot table is greater than a quantity of heat provided to the upper hot table.

2. The method of claim 1, wherein a quantity of heat provided to a lower portion of the annular hot table is greater than a quantity of heat provided to an upper portion of the annular hot table.

3. The method of claim 1, wherein the quantity of heat provided to the lower hot table is greater than the quantity of heat provided to the upper hot table, and
   wherein a quantity of heat provided to a lower portion of the annular hot table is greater than a quantity of heat provided to an upper portion of the annular hot table.

4. The method of claim 1, wherein a heating fluid is supplied to the lower hot table.

5. The method of claim 1, wherein a heating fluid is supplied to the upper hot table.

6. The method of claim 1, wherein a heating fluid is supplied to the annular hot table.

7. The method of claim 1, wherein a first heating fluid is supplied to the lower hot table, and
   wherein a second heating fluid is supplied to the upper hot table.

8. The method of claim 7, wherein a temperature of the first heating fluid is greater than a temperature of the second heating fluid.

9. The method of claim 8, wherein the temperature of the first heating fluid is between 155° C. and 165° C.

10. The method of claim 8, wherein the temperature of the second heating fluid is between 148° C. and 158° C.

11. The method of claim 7, wherein the first heating fluid comprises dry, saturated steam, or
    wherein the second heating fluid comprises dry, saturated steam, or
    wherein the first heating fluid comprises dry, saturated steam and the second heating fluid comprises dry, saturated steam.

12. The method of claim 1, wherein a first heating fluid is supplied to the lower hot table,
    wherein a second heating fluid is supplied to the upper hot table, and
    wherein a third heating fluid is supplied to the annular hot table.

13. The method of claim 12, wherein a temperature of the first heating fluid is greater than a temperature of the second heating fluid.

14. The method of claim 13, wherein the temperature of the first heating fluid is between 155° C. and 165° C.

15. The method of claim 13, wherein the temperature of the second heating fluid is between 148° C. and 158° C.

16. The method of claim 15, wherein the first heating fluid comprises dry, saturated steam, or
    wherein the second heating fluid comprises dry, saturated steam, or
    wherein the first heating fluid comprises dry, saturated steam and the second heating fluid comprises dry, saturated steam.

17. The method of claim 1, wherein a first heating fluid is supplied to a lower portion of the annular hot table, and
    wherein a second heating fluid is supplied to an upper portion of the annular hot table.

18. The method of claim 17, wherein a temperature of the first heating fluid is greater than a temperature of the second heating fluid.

19. The method of claim 18, wherein the temperature of the first heating fluid is between 155° C. and 165° C.

20. The method of claim 18, wherein the temperature of the second heating fluid is between 148° C. and 158° C.

21. The method of claim 17, wherein the first heating fluid comprises dry, saturated steam, or
    wherein the second heating fluid comprises dry, saturated steam, or
    wherein the first heating fluid comprises dry, saturated steam and the second heating fluid comprises dry, saturated steam.

22. The method of claim 1, wherein a heating fluid is supplied to the lower hot table, and
    wherein the heating fluid also is supplied to a lower portion of the annular hot table.

23. The method of claim 22, wherein a temperature of the heating fluid is between 155° C. and 165° C.

24. The method of claim 22, wherein the heating fluid comprises dry, saturated steam.

25. The method of claim 1, wherein a heating fluid is supplied to the upper hot table, and wherein the heating fluid also is supplied to an upper portion of the annular hot table.

26. The method of claim 22, wherein a temperature of the heating fluid is between 148° C. and 158° C.

27. The method of claim 22, wherein the heating fluid comprises dry, saturated steam.

28. The method of claim 1, wherein a first heating fluid is supplied to the lower hot table,
wherein a second heating fluid is supplied to the upper hot table,
wherein the first heating fluid also is supplied to a lower portion of the annular hot table, and
wherein the second heating fluid also is supplied to an upper portion of the annular hot table.

29. The method of claim 28, wherein a temperature of the first heating fluid is greater than a temperature of the second heating fluid.

30. The method of claim 29, wherein the temperature of the first heating fluid is between 155° C. and 165° C.

31. The method of claim 29, wherein the temperature of the second heating fluid is between 148° C. and 158° C.

32. The method of claim 28, wherein the first heating fluid comprises dry, saturated steam, or
wherein the second heating fluid comprises dry, saturated steam, or
wherein the first heating fluid comprises dry, saturated steam and the second heating fluid comprises dry, saturated steam.

33. A method for curing a tyre, comprising the steps of:
closing the tyre in a mould;
heating at least one lower hot table to transmit heat to the tyre;
heating at least one upper hot table to transmit heat to the tyre; and
heating at least one annular hot table to transmit heat to the tyre;
wherein the at least one lower hot table, the at least one upper hot table, and the at least one annular hot table are associated with the mould,
wherein the at least one annular hot table is thermally-connected to a circumferential development of the mould, and
wherein a quantity of heat provided to the at least one lower hot table is greater than a quantity of heat provided to the at least one upper hot table.

34. A method for curing a tyre, comprising the steps of:
closing the tyre in a mould;
transmitting heat to the tyre;
opening the mould; and
removing the tyre from the mould;
wherein the mould comprises a cavity at least partly delimited by a lower cheek, an upper cheek, and a plurality of moulding dies,
wherein the lower cheek is thermally-connected to at least one lower hot table,
wherein the upper cheek is thermally-connected to at least one upper hot table,
wherein the plurality of moulding dies is thermally-connected to at least one annular hot table,
wherein the at least one annular hot table is thermally-connected to a circumferential development of the mould,
wherein the step of closing the tyre in the mould comprises decreasing a distance between the lower cheek and the upper cheek, wherein the step of closing the tyre in the mould further comprises moving the plurality of moulding dies toward a rotation axis of the tyre,
wherein the step of transmitting heat to the tyre comprises providing quantities of heat to the at least one lower hot table, the at least one upper hot table, and the at least one annular hot table,
wherein the quantity of heat provided to the at least one lower hot table is greater than the quantity of heat provided to the at least one upper hot table,
wherein the step of opening the mould comprises increasing the distance between the lower cheek and the upper cheek, and
wherein the step of opening the mould further comprises moving the plurality of moulding dies away from the rotation axis of the tyre.

35. The method of claim 34, wherein indentations in a tread band of the tyre at least partly guide moving the plurality of moulding dies away from the rotation axis of the tyre.

36. An apparatus for curing a tyre, comprising:
a mould;
a lower hot table;
an upper hot table;
an annular hot table; and
devices for supplying one or more first heating fluids to the lower hot table, the upper hot table, and the annular hot table;
wherein the mould comprises a cavity,
wherein the lower hot table is thermally-connected to a lower cheek of the mould,
wherein the upper hot table is thermally-connected to an upper cheek of the mould,
wherein the annular hot table is thermally-connected to a circumferential development of the mould, and
wherein a temperature of the one or more first heating fluids supplied to the lower hot table is greater than a temperature of the one or more first heating fluids supplied to the upper hot table.

37. The apparatus of claim 36, wherein the annular hot table comprises a lower portion and an upper portion.

38. The apparatus of claim 37, wherein a temperature of the one or more first heating fluids supplied to the lower portion of the annular hot table is greater than a temperature of the one or more first heating fluids supplied to the upper portion of the annular hot table.

39. The apparatus of claim 37, wherein the lower portion of the annular hot table is in fluid communication with the lower hot table.

40. The apparatus of claim 37, wherein the upper portion of the annular hot table is in fluid communication with the upper hot table.

41. The apparatus of claim 36, further comprising:
a first conduit for injecting a second heating fluid into an interior of the cavity; and
a second conduit for extracting the second heating fluid from the interior of the cavity.

42. The apparatus of claim 37, wherein a lower containment portion of a containment structure comprises the lower portion of the annular hot table,
wherein an upper containment portion of the containment structure comprises the upper portion of the annular hot table, and
wherein a distance between the containment portions in an open condition is greater than the distance between the containment portions in a closed condition.

43. The apparatus of claim 36, wherein a lower containment portion of the mould comprises a plurality of lower radial sectors, wherein an upper containment portion of the mould comprises a plurality of upper radial sectors, wherein, in a closed condition of the containment portions, the lower and upper radial sectors are circumferentially distributed about a geometric axis of the cavity, wherein each of the radial sectors comprises a support body slidingly engaged to a corresponding containment portion, wherein, in an open condition of the containment portions, the radial sectors are axially-distant from a rotation axis of the tyre, wherein, in a closed condition of the containment portions, the radial sectors are axially-close to the rotation axis of the tyre, wherein, in a closed condition of the containment portions, the radial sectors at least partly delimit the cavity, and wherein each sector comprises at least one moulding die removably engaged to the respective support body.

44. The apparatus of claim 43, wherein each sector comprises at least two moulding dies removably engaged to the respective support body.

45. The apparatus of claim 43, wherein each of the moulding dies comprises a circumferential extension corresponding to a pitch of a tread design to be defined on the tyre.

46. The apparatus of claim 43, wherein, in a closed condition of the containment portions, the lower radial sectors contact the upper radial sectors substantially near an equatorial plane of the cavity.

47. An apparatus for curing a tyre, comprising:

a mould;

at least one lower hot table;

at least one upper hot table;

at least one annular hot table; and devices for supplying one or more heating fluids to the at least one lower hot table, the at least one upper hot table, and the at least one annular hot table;

wherein the mould comprises a cavity, wherein the at least one lower hot table is thermally-connected to a lower cheek of the mould, wherein the at least one upper hot table is thermally-connected to an upper cheek of the mould, wherein the at least one annular hot table is thermally-connected to a circumferential development of the mould, and wherein a temperature of the one or more heating fluids supplied to the at least one lower hot table is greater than a temperature of the one or more heating fluids supplied to the at least one upper hot table.

* * * * *

UNITED STATES PATENT AND TRADEMARK OFFICE
CERTIFICATE OF CORRECTION

PATENT NO. : 6,841,113 B2
DATED : January 11, 2005
INVENTOR(S) : Renato Caretta

It is certified that error appears in the above-identified patent and that said Letters Patent is hereby corrected as shown below:

Column 14,
Line 32, "claim 15" should read -- claim 12, --.

Column 17,
Line 6, "dosed" should read -- closed --.

Signed and Sealed this

Twenty-sixth Day of April, 2005

JON W. DUDAS
*Director of the United States Patent and Trademark Office*